US006601989B2

(12) United States Patent
Tanaka

(10) Patent No.: US 6,601,989 B2
(45) Date of Patent: Aug. 5, 2003

(54) X-RAY FILM DEVELOPMENT DEVICE

(75) Inventor: Hiroyuki Tanaka, Kanagawa (JP)

(73) Assignee: Nix Company Ltd., Tokyo (JP)

( * ) Notice: Subject to any disclaimer, the term of this patent is extended or adjusted under 35 U.S.C. 154(b) by 0 days.

(21) Appl. No.: 10/176,068

(22) Filed: Jun. 21, 2002

(65) Prior Publication Data

US 2002/0196904 A1 Dec. 26, 2002

(30) Foreign Application Priority Data

Jun. 26, 2001 (JP) .................................... P2001-230564

(51) Int. Cl.[7] ............................................... G03B 42/04
(52) U.S. Cl. ........................ 378/183; 396/631; 396/639
(58) Field of Search ................................ 378/168, 169, 378/171–174, 182, 183, 188; 396/564, 567, 570, 631, 639, 569; 355/27, 29

(56) References Cited

U.S. PATENT DOCUMENTS 5,101,286 A * 3/1992 Patton ........................ 358/487
5,144,474 A * 9/1992 Keable et al. .............. 354/319
5,237,358 A 8/1993 Yamada et al.
5,432,579 A 7/1995 Tokuda
5,664,253 A 9/1997 Meyers
5,870,172 A 2/1999 Blume
5,984,543 A 11/1999 Ramello et al.
6,048,111 A * 4/2000 Kurumisawa et al. ...... 396/622
6,181,809 B1 1/2001 Primo et al.

* cited by examiner

*Primary Examiner*—Drew A. Dunn
*Assistant Examiner*—Irakli Kiknadze
(74) *Attorney, Agent, or Firm*—Ditthavong & Carlson, P.C.

(57) ABSTRACT

An X-ray film development device performs development, fixing, rinsing, and drying processes while transporting an exposed X-ray film. A rinsing unit is provided with a light source, which illuminates the X-ray film during transportation, and a reading unit, which receives the passing light and reads an image recorded on the X-ray film. The image signal from the reading unit is processed by a display device (CRT, LCD, etc.), and the film image can be provided to the doctor or patient without waiting until the film dries.

13 Claims, 5 Drawing Sheets

X-RAY FILM DEVELOPMENT DEVICE

BACKGROUND OF THE INVENTION

1. Field of the Invention

The present invention relates to an X-ray film development device used for dental practice, for example.

2. Description of the Related Art

In a dental practice, sometimes the teeth and roots of a patient are X-rayed and treatment is provided based on the developed X-ray film. At this time, the treatment or correction etc. is performed by informed consent, that is, by showing the developed film to the patient and explaining the state of the teeth and the future treatment plan.

Conventionally, after the roentgenography, the X-ray film is subjected to a developing procedure, a fixing procedure, and a rinsing procedure. Since the X-ray film cannot be viewed in the wet state, the X-ray film is dried, and then viewed while applying light from the back by a planar light source etc. As a method for drying the film, various methods such as applying hot air are known. However, significant time elapses until the drying period ends, and thus, time is taken until the developed film can be diagnosed, and hence, a quick explanation cannot be given to the patient.

SUMMARY OF THE INVENTION

Therefore, an object of the present invention is to provide an X-ray film development device, in which a film image can be viewed immediately after development.

According to the present invention, there is provided an X-ray film development device in which an exposed X-ray film is transported in a developing unit, a fixing unit, a rinsing unit, and a drying unit, in this order. The X-ray film development device comprises a light source and an optical sensor. The light source illuminates the X-ray film. The optical sensor receives the light passing through the X-ray film to read an image recorded on the X-ray film. The light source and the optical sensor are provided at a point after the developing unit.

When reproducing the image signal on a suitable display device, it is possible to view the film image on the screen immediately after development. The image of the film can be read in the fixing unit, the rinsing unit, and the drying unit, for example.

Further, according to the present invention, there is provided a film development device comprising a developing unit, a fixing unit, a rinsing unit, a light source, and an optical sensor. The developing unit develops an exposed X-ray film. The fixing unit fixes the X-ray film after the developing procedure. The rinsing unit rinses the X-ray film after the fixing procedure. The light source illuminates the X-ray film. The light source is provided in the rinsing unit. The optical sensor receives the light passing through the X-ray film to read an image recorded on the X-ray film. The optical sensor is provided in the rinsing unit.

Furthermore, according to the present invention, there is provided an X-ray film development device in which an exposed X-ray film is transported in a developing unit, a fixing unit, and a rinsing unit, in this order. The X-ray film development device comprises a light source and an optical sensor. The light source illuminates the X-ray film. The optical sensor receives the light that has passed through the X-ray film to read an image recorded on the X-ray film. The light source and the optical sensor are provided in the rinsing unit.

Further, according to the present invention, there is provided an X-ray film development device comprising a light source that illuminates an X-ray film after development, and an optical sensor that receives the light passing through the X-ray film to read an image recorded on the X-ray film.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
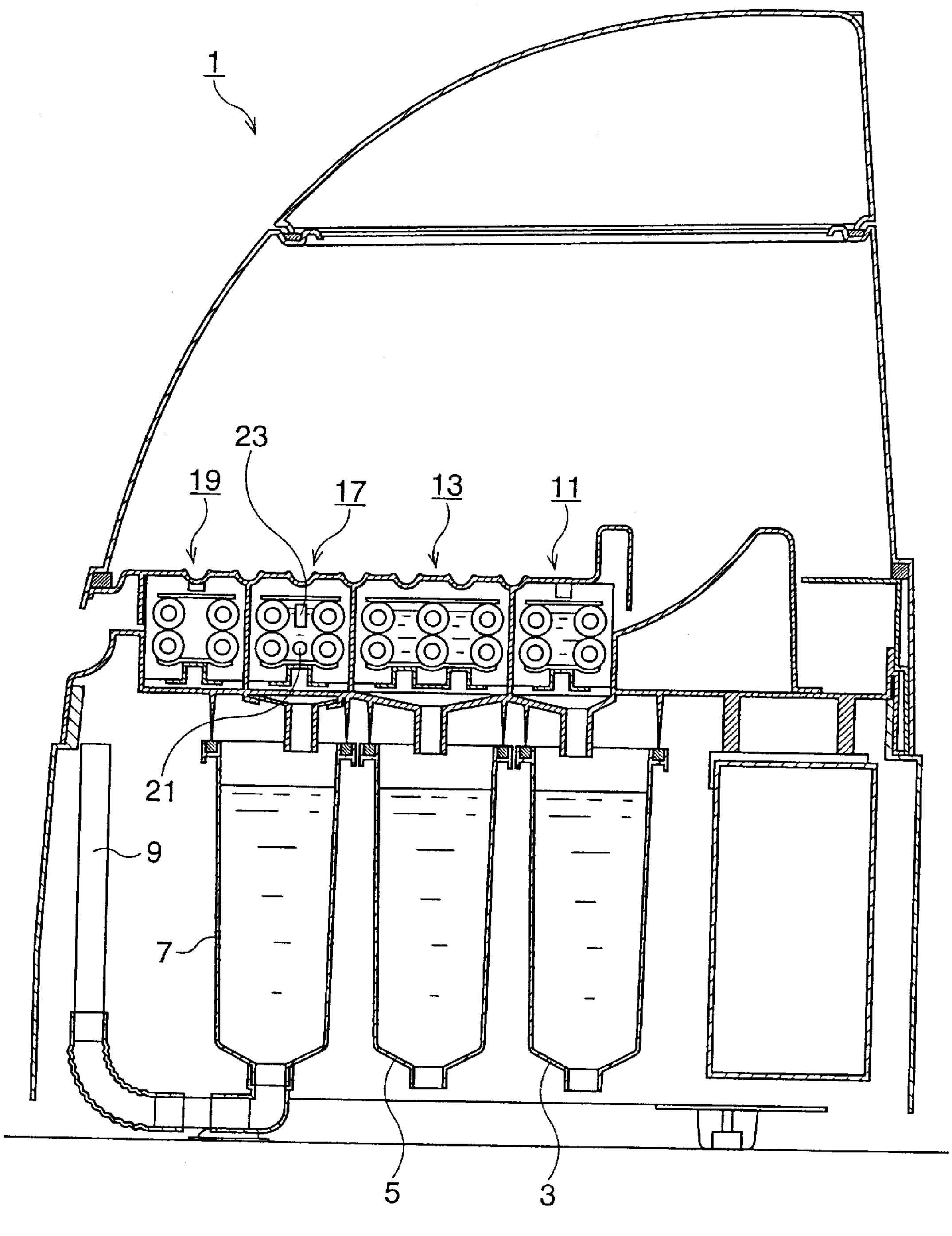
FIG. 1 is a sectional view of a first embodiment of an X-ray film development device of the present invention.

The present invention will be described below with reference to the embodiments shown in the drawings.

FIG. 1 is a sectional view of a first embodiment of an X-ray film automatic development device for dentistry. The X-ray film development device 1 is provided with tanks 3, 5, and 7 filled with a developer, a fixing solution, and a washing solution (water). A water level display tube 9 is connected to the tank 7. Similarly, liquid level display tubes (not shown) are connected to the tanks 3 and 5. A developing unit 11, a fixing unit 13, and a rinsing unit 17 are arranged above the tanks 3, 5, and 7. A drying unit 19 is connected to the rinsing unit 17.

An exposed X-ray film is developed by the developing unit 11. The X-ray film is fixed by the fixing unit 13 after the developing procedure, and is then rinsed by the rinsing unit 17 after the fixing procedure. In the rinsing unit 17, an image reading operation is performed so that an image recorded in the X-ray film is read, as described later. The X-ray film is dried by the drying unit 19 after the rinsing reading procedure.

A light source 21 and a reading unit 23 are provided in the rinsing unit 17. The light source 21 illuminates the X-ray film. Namely, the light source 21 emits light onto the X-ray film, so that the light which has passed through the X-ray film is received by the reading unit 23 to read an image recorded on the X-ray film.

Figure 2:
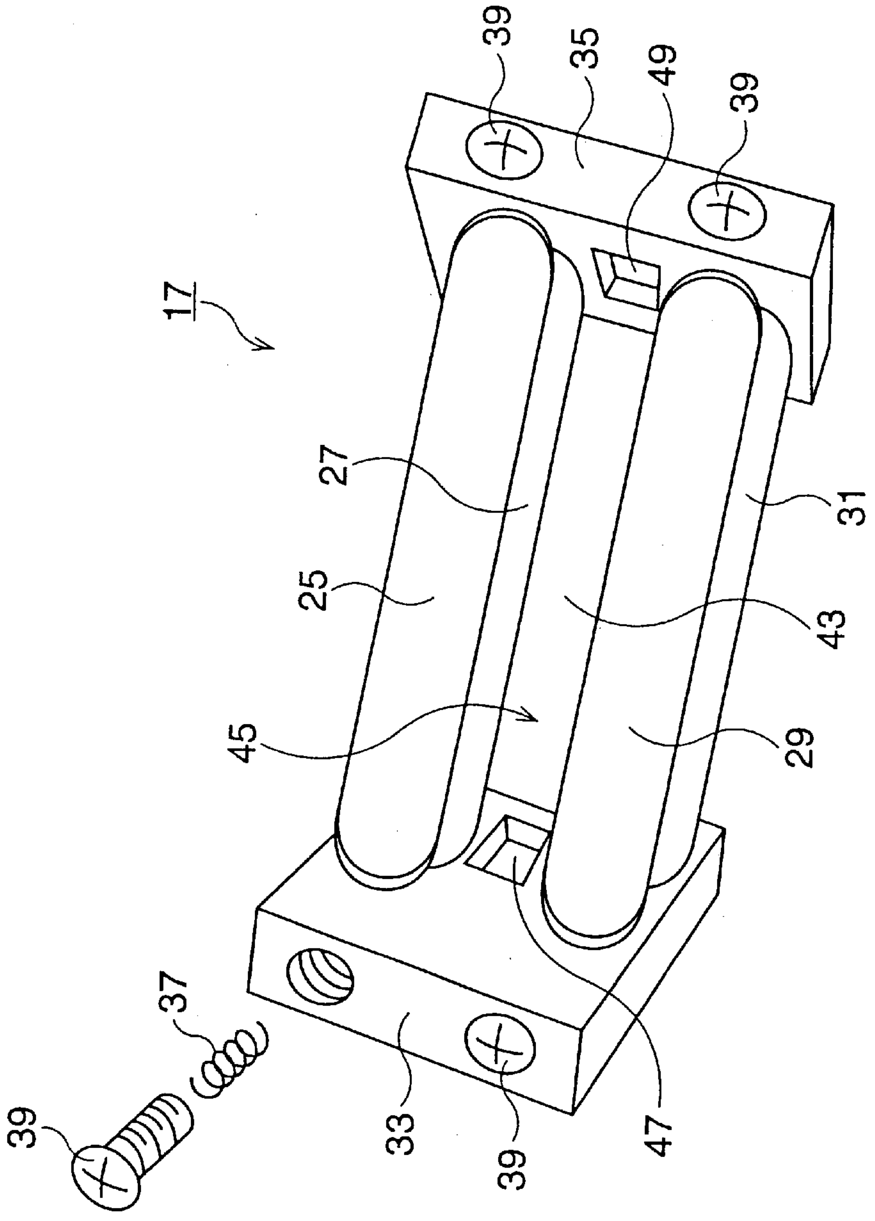
FIG. 2 is a perspective view of a roller unit.
Figure 3:
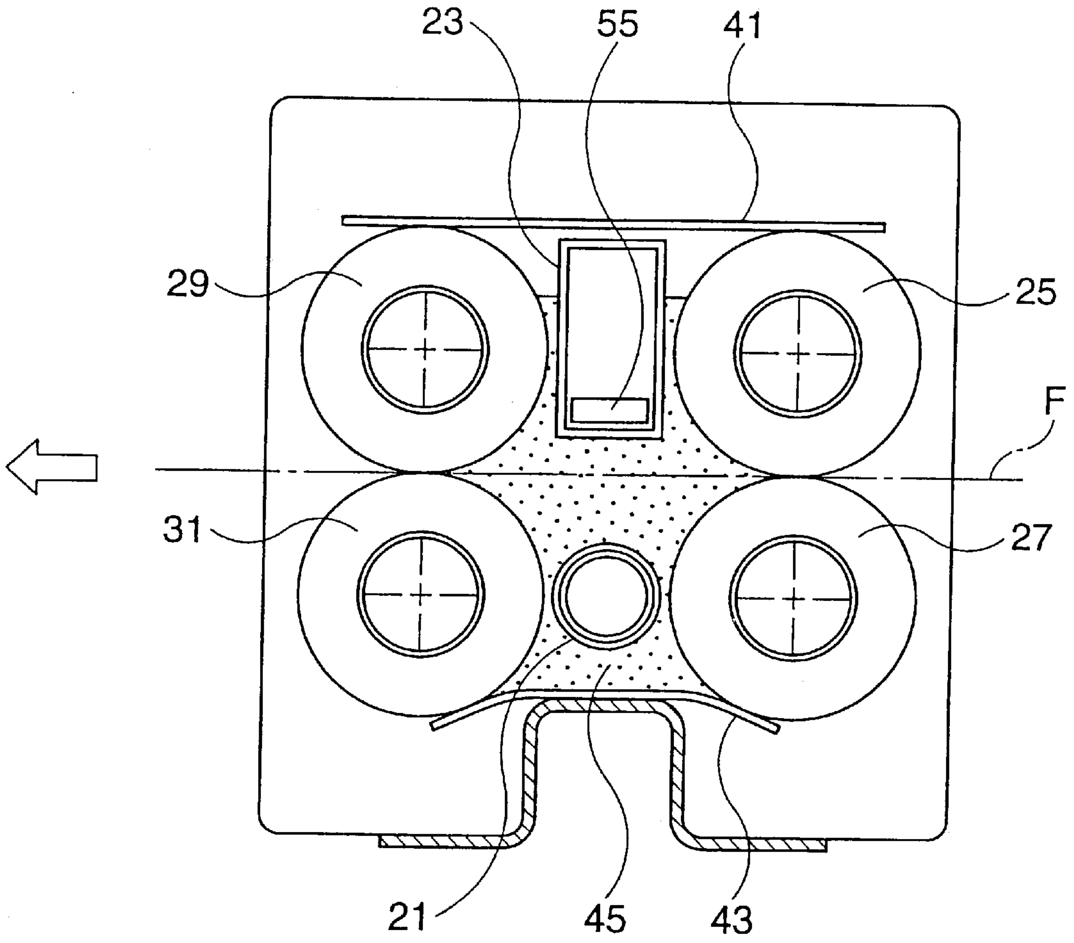
FIG. 3 is a sectional view of a roller unit.

FIGS. 2 and 3 show the rinsing unit 17. The rinsing unit 17 is provided with a first pair of rollers 25 and 27 contacting each other, and a second pair of rollers 29 and 31 contacting each other. The two ends of each pair of rollers are supported rotatably at blocks 33 and 35. The top rollers 25 and 29 are fixed by stop screws 39 at their roller shafts through the springs 37. By adjusting the degree of fastening of the stop screws 39, it is possible to adjust the nip pressure of the pairs of rollers. Each pair of rollers is driven to rotate through a gear mechanism, so that the X-ray film F is transported while gripped between the rollers.

A top plate 41 is arranged on the top surfaces of the top rollers 25 and 29, and a bottom plate 43 is arranged on the lower surfaces of the bottom rollers 27 and 31, to define a space or processing chamber 45 by the top and bottom plates 41 and 43 and the two pairs of rollers 25, 27, 29, and 31. The light source 21 and the reading unit 23 are housed in the processing chamber 45. The light source 21 and the reading unit 23 are disposed between the two pairs of rollers, and extend parallel to the two pairs of rollers. By providing the top plate 41, evaporation of the processing solution 45 is prevented, and the processing chamber 45 can be reliably shielded from light.

A feed port 47 is formed in the block 33, so that the washing solution in the tank 7 is fed to the processing chamber 45. A discharge port 49 is formed in the block 35 at a higher position than the roller contact surfaces of the pair of rollers. The washing solution is pumped up from the tank 7, and fed from the feed port 47 to the processing chamber 45 by a pump (not shown). The washing solution overflows from the discharge port 49, and is returned to the tank 7. The processing chamber 45 constantly holds a certain amount of washing solution. The film F is transported in the processing chamber 45 by the pairs of rollers 25, 27, 29, and 31. The structures described above are similar in the units 11, 13, and 19, but in the case of the drying unit 19, instead of the processing solution, hot air is fed into the processing chamber.

Figure 4:
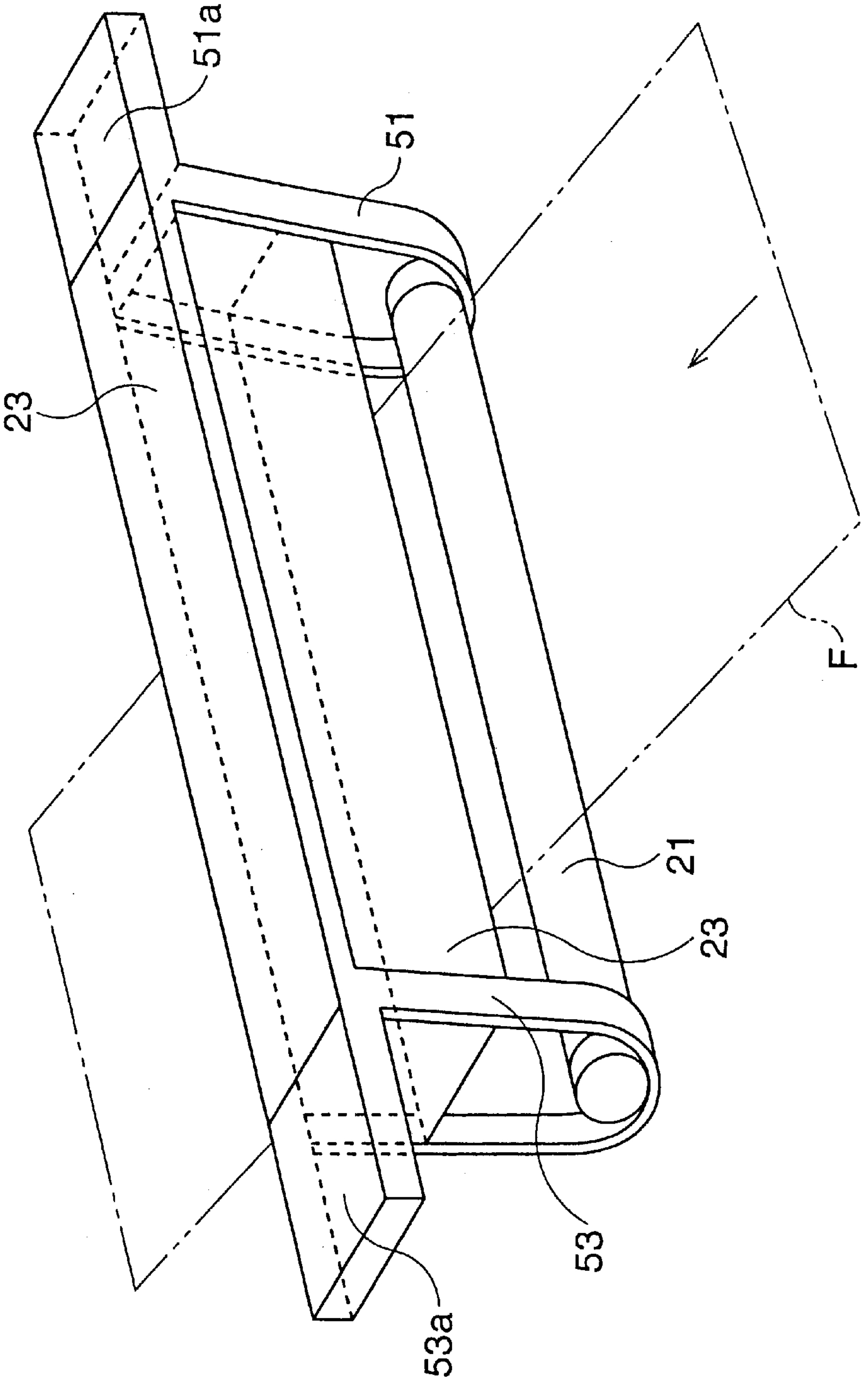
FIG. 4 is a perspective view of a film image reading device.

As shown in FIG. 4, the light source 21 and the reading unit 23 are fixed at their two ends to brackets 51 and 53. The brackets 51 and 53 are provided with flanges 51*a* and 53*a*. By fixing the flanges 51*a* and 53*a* to the blocks 33 and 35, the light source 21 and the reading unit 23 are arranged in the washing solution. The light source 21 and the reading unit 23 are treated to waterproof them. The light source 21 and the reading unit 23 are positioned so that the film F is transported between the light source 21 and the reading unit 23. The reading unit 23 is provided with an optical sensor or imaging device (CCD etc.) 55, which reads an image recorded on the X-ray film F, and an optical system, which forms the image on the optical sensor 55.

When using the X-ray film development device 1, the exposed X-ray film, which is developed and fixed, is transported by the two pairs of rollers 25, 27, 29, and 31 as shown in FIG. 3, and during the transportation, the X-ray film is illuminated by the light source 21. The light that passes through the film is read by the optical sensor 55, and the image signal is output outside. The image signal is reproduced by a suitable display device (CRT, LCD, etc.), and the reproduced film image is provided to the doctor or patient. In this way, the image is read immediately after development, so there is no need to wait until the film dries. Therefore, the necessary information can be quickly provided without keeping the patient waiting. Further, since the film is read while immersed in the solution, the surface of the film is immersed in the liquid uniformly without unevenness, so a clean image is obtained.

As shown in FIG. 4, if providing the light source 21 and the reading unit 23 away and connecting them to form a film image reading device, it is possible to easily attach this to different kinds or types of automatic development devices. Further, as shown in FIG. 4, if using the brackets 51 and 53 to enable the film image reading device to be fixed in a processing chamber, and the assembly becomes easy.

Figure 5:
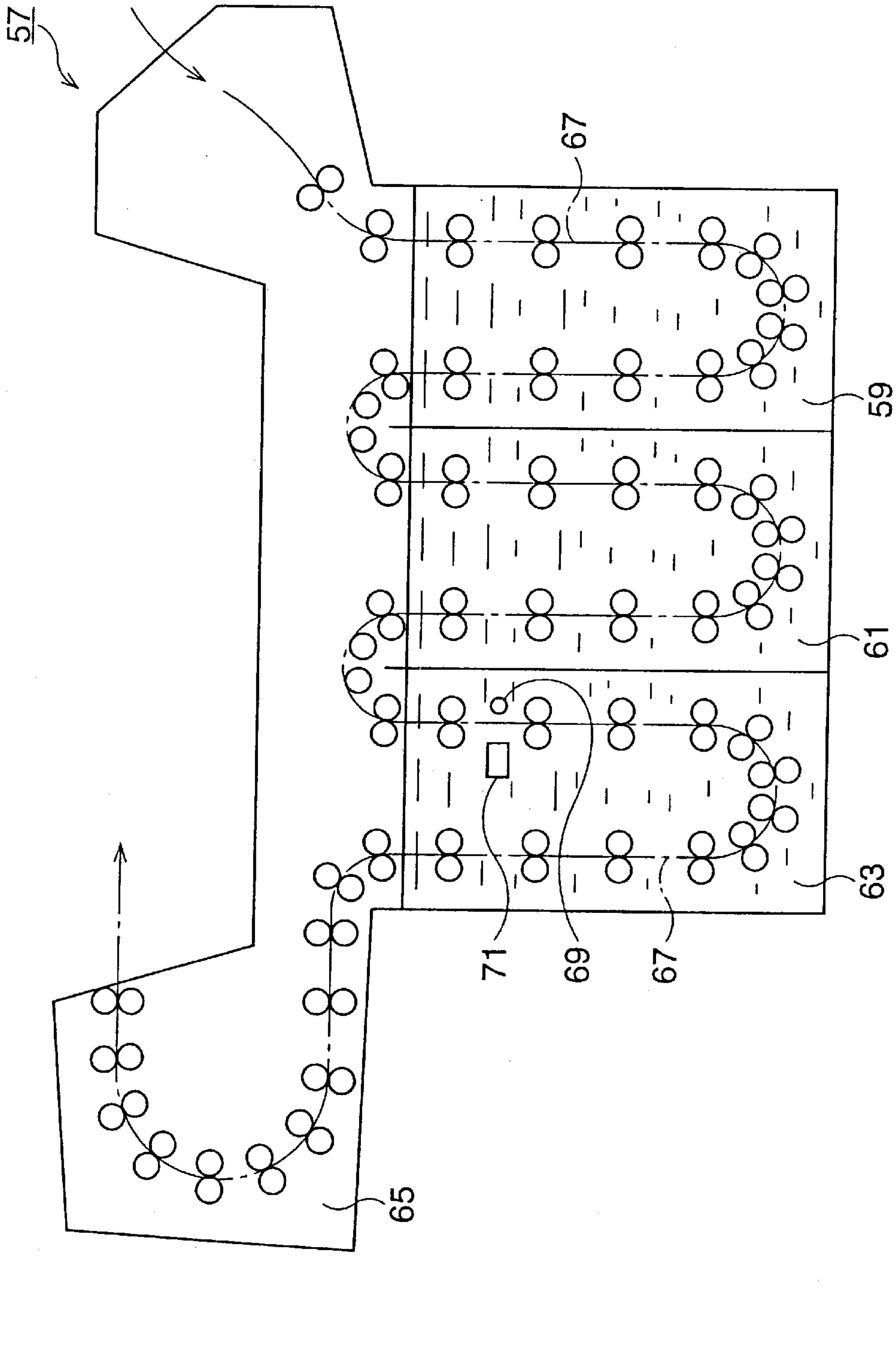
FIG. 5 is a sectional view of a second embodiment of an X-ray film development device.

In the first embodiment, the X-ray film development device 1 is used for dentistry, but the present invention is not limited to this. Namely, the present invention can be applied to an X-ray film automatic development device for general medicine such as shown in FIG. 5. That is, the X-ray film development device 57 is provided with a developing tank 59, a fixing tank 61, a rinsing tank 63, and a drying chamber 65. The X-ray film is processed along the transport path 67. In the rinsing tank 63, the light source 69 and the reading unit 70 are arranged straddling the transport path 67. The basic structures of the light source 69 and the reading unit 70 are similar to those shown in FIGS. 3 and 4. When using such an X-ray film development device, it is possible to view the film image even in an X-ray film development device for general medicine without waiting for the film to dry.

In the second embodiment, the film image is read in the rinsing unit, but the image may be read at any position during the film transport after development. Namely, the light source and the reading unit may be provided at any point during the film transport after the developing unit.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2001-230564 (filed on Jun. 26, 2001) which is expressly incorporated herein, by reference, in its entirety.

What is claimed is:

1. An X-ray film development device in which an exposed X-ray film is transported in a developing unit, a fixing unit, a rinsing unit, and a drying unit, in this order, said X-ray film development device comprising:

a light source that illuminates said X-ray film; and an optical sensor that receives the light passing through said X-ray film to read an image recorded on said X-ray film, wherein said light source and said optical sensor are waterproof and provided in said rinsing unit.

2. A device according to claim 1, wherein a washing solution in the rinsing unit flows perpendicular to transport direction of said X-ray film.

3. A device according to claim 1, wherein the light source and the optical sensor form an assembly unit.

4. An X-ray film development device comprising:

a developing unit that develops an exposed X-ray film;

a fixing unit that fixes said X-ray film after the developing procedure;

a rinsing unit that rinses said X-ray film after the fixing procedure;

a light source that illuminates said X-ray film, said light source being waterproof and provided in said rinsing unit; and an optical sensor that receives the light passing through said X-ray film to read an image recorded on said X-ray film, said optical sensor being waterproof and provided in said rinsing unit.

5. A device according to claim 4, wherein said rinsing unit is provided with two pairs of rollers for transporting said X-ray film, and said light source and said optical sensor are disposed between said two pairs of rollers.

6. A device according to claim 5, wherein said rinsing unit is provided with a first plate arranged on the top surfaces of said two pairs of rollers and a second plate arranged on the lower surfaces of said two pairs of rollers, to define a processing chamber by said first and second plates and said two pairs of rollers, said light source and said optical sensor being housed in said processing chamber.

7. A device according to claim 4, wherein said light source and said optical sensor extend parallel to said two pairs of rollers.

8. A device according to claim 4, wherein a washing solution in the rinsing unit flows perpendicular to transport direction of said X-ray film.

9. A device according to claim 4, wherein the light source and the optical sensor form an assembly unit.

10. An X-ray film development device in which an exposed X-ray film is transported in a developing unit, a fixing unit, and a rinsing unit, in this order, said X-ray film developing device comprising:

a light source that illuminates said X-ray film; and an optical sensor that receives the passing light through said X-ray film to read an image recorded in said X-ray film;

said light source and said optical sensor being provided in said rinsing unit.

11. An X-ray film development device comprising:

a light source that illuminates an X-ray film after development; and an optical sensor that receives the light passing through said X-ray film to read an image recorded on said X-ray film, wherein said light source and said optical sensor are waterproof and disposed in a rinsing unit of the device.

12. A device according to claim 11, wherein a washing solution in the rinsing unit flows perpendicular to transport direction of said X-ray film.

13. A device according to claim 11, wherein the light source and the optical sensor form an assembly unit.

* * * * *